United States Patent
Bleeck et al.

(10) Patent No.: US 7,089,962 B2
(45) Date of Patent: Aug. 15, 2006

(54) COMPENSATION DEVICE FOR COMPENSATING VOLUMETRIC EXPANSION OF MEDIA, ESPECIALLY OF A UREA-WATER SOLUTION DURING FREEZING

(75) Inventors: Matthias Bleeck, Aschaffenburg (DE); Friedrich Zapf, Karlstadt (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 196 days.

(21) Appl. No.: 10/605,763

(22) Filed: Oct. 24, 2003

(65) Prior Publication Data

US 2004/0129325 A1 Jul. 8, 2004

(30) Foreign Application Priority Data

Oct. 25, 2002 (DE) ......................... 102 49 750

(51) Int. Cl.
*F16L 53/00* (2006.01)

(52) U.S. Cl. .................. 138/32; 138/30; 138/31
(58) Field of Classification Search .................. 138/27, 138/30, 31, 26, 32
See application file for complete search history.

(56) References Cited

U.S. PATENT DOCUMENTS

| | | | | |
|---|---|---|---|---|
| 1,465,134 A | * | 8/1923 | Jonsson | 123/41.01 |
| 2,809,665 A | * | 10/1957 | Crowe | 138/30 |
| 2,884,955 A | * | 5/1959 | Yost | 138/31 |
| 3,404,802 A | * | 10/1968 | Bettcher | 220/721 |
| 4,217,758 A | * | 8/1980 | Bach et al. | 60/404 |
| 4,611,795 A | * | 9/1986 | Muzechuk | 267/140.13 |
| 4,848,389 A | * | 7/1989 | Pirkle | 137/80 |
| 5,408,970 A | | 4/1995 | Burkhard et al. | 123/447 |
| 5,590,631 A | | 1/1997 | Tuckey | 123/447 |
| 5,701,869 A | | 12/1997 | Richardson et al. | 123/497 |
| 5,727,529 A | | 3/1998 | Tuckey | 123/514 |
| 5,785,025 A | | 7/1998 | Yoshiume et al. | 123/497 |
| 5,842,455 A | | 12/1998 | Tuckey et al. | 123/514 |
| 6,203,117 B1 | * | 3/2001 | Starr et al. | 303/87 |
| 6,321,719 B1 | | 11/2001 | Schwegler | 123/467 |
| 6,363,719 B1 | * | 4/2002 | Mohr et al. | 60/414 |
| 6,390,133 B1 | * | 5/2002 | Patterson et al. | 138/31 |
| 6,478,051 B1 | * | 11/2002 | Drumm et al. | 138/30 |
| 6,488,487 B1 | * | 12/2002 | Minato | 417/540 |
| 6,527,012 B1 | * | 3/2003 | Weber | 138/31 |
| 6,616,247 B1 | * | 9/2003 | Mohr | 303/87 |

* cited by examiner

*Primary Examiner*—James Hook

(57) ABSTRACT

A compensation device for compensating a volumetric expansion of a medium during freezing has a receptacle provided in a structural component. The medium is contained in the receptacle. A sealing element is provided that delimits the receptacle. The sealing element is prestressed by a prestressing force provided by a pressure spring against the operating pressure of the medium.

14 Claims, 2 Drawing Sheets

COMPENSATION DEVICE FOR COMPENSATING VOLUMETRIC EXPANSION OF MEDIA, ESPECIALLY OF A UREA-WATER SOLUTION DURING FREEZING

BACKGROUND OF INVENTION

1. Field of the Invention

The invention relates to a compensation device for compensating a volumetric expansion of media, in particular, a urea-water solution, during freezing, wherein the media are arranged in a receptacle of a structural component.

2. Description of the Related Art

It is known, for example, in connection with exhaust gas after treatment devices of diesel engine vehicles, to convey a urea-water solution from a reservoir and to supply it at a certain pressure to an injection valve. When external temperatures are low, there exists the problem that this medium can freeze. This causes problems because of the volumetric expansion of the medium.

SUMMARY OF INVENTION

It is an object of the present invention to configure the compensation device of the aforementioned kind such that, on the one hand, it can be mounted easily, and, on the other hand, it prevents problems related to freezing of the medium.

In accordance with the present invention, this is achieved in that the receptacle is delimited by a sealing element that is prestressed relative to the operating pressure of the medium.

In the compensation device according to the invention the receptacle containing the medium is delimited by a sealing element that is prestressed against the operational pressure of the medium. In the case that the medium freezes as a result of low temperatures, the volumetric expansion of the medium caused by freezing is compensated in that the sealing element is displaced against the prestressing force. Accordingly, the receiving space for the medium is enlarged so that the volumetric expansion during freezing of the medium does not cause any problems. When the temperature rises, the sealing element is pushed back by the prestressing force and, accordingly, the receiving space for the medium is reduced.

DETAILED DESCRIPTION

The compensation device is provided, for example, in a receptacle of the medium, in particular, a urea-water solution, used in connection with hydraulic components, in particular, for exhaust gas after treatment of motor vehicles, in particular, diesel engine vehicles. Moreover, the compensation device can be used for all media that can freeze and experience a volumetric expansion as a result of freezing.

Figure 1:
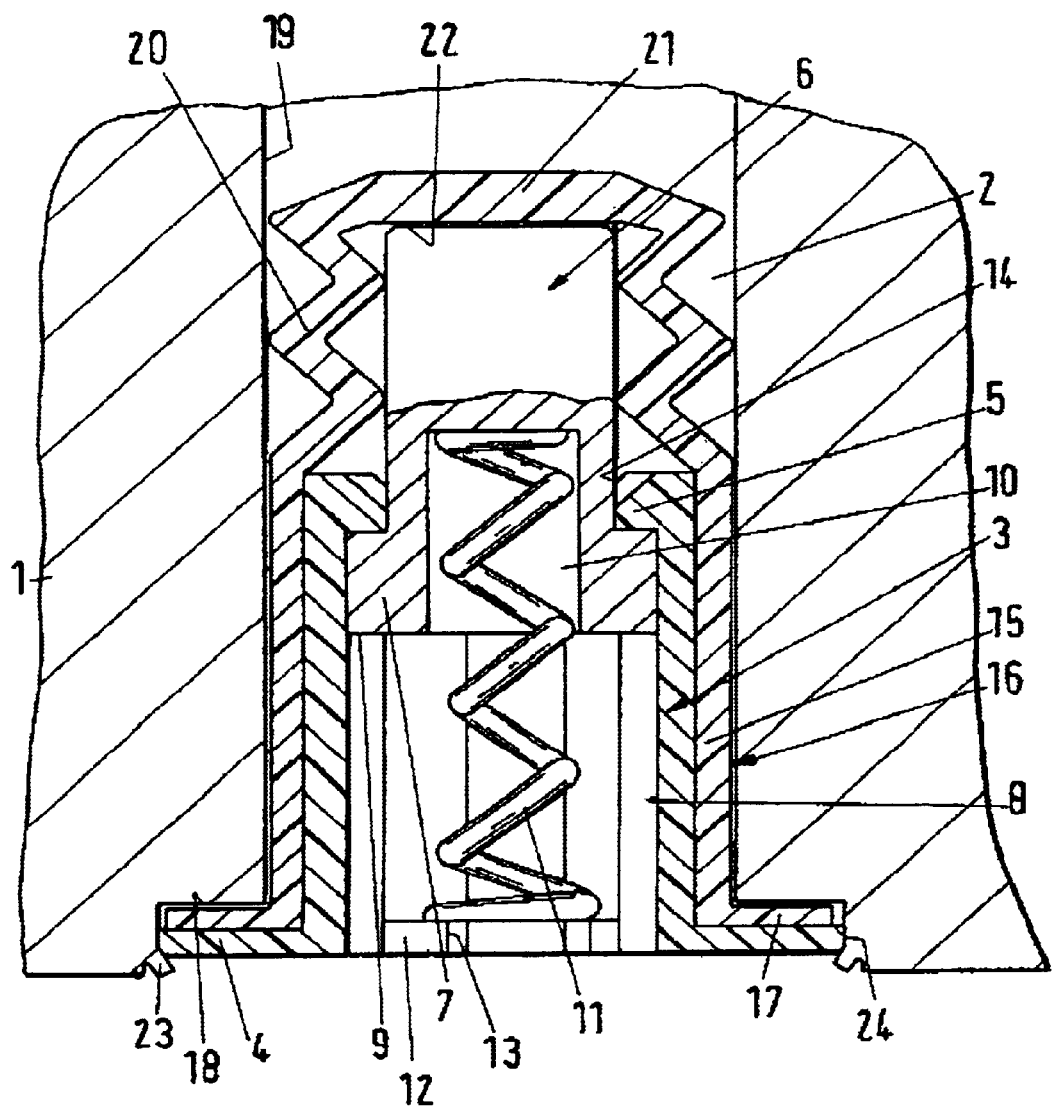
FIG. 1 is a section view of a first embodiment of the compensation device according to the invention.

The compensation device according to FIG. 1 is inserted into a structural component 1 which has a receptacle 2, preferably a bore, for the compensation device. The compensation device comprises a sleeve 3 which is advantageously made of plastic material and is provided at one end with a holding part in the form of a radial outwardly oriented flange 4. On the opposite end, this sleeve 3 is provided with a radial inwardly oriented flange 5 that is narrower in the radial direction than the flange 4. The flange 5 serves as a stop for a piston 6. The piston 6 has at its end facing the flange 4 a radial outwardly oriented flange 7. The piston 6 glides along the inner wall 8 of the sleeve 3 by means of the flange 7. The piston 6 is provided at its end face 9 where the flange 7 is located with a central recess 10 into which the end of a helical pressure spring 11 projects. Under the prestressing force of this spring 11, the flange 7 is forced against the flange 5 of the sleeve 3.

The other end of the pressure spring 11 is supported on a projection of the sleeve 3 or on a lid 12 that is provided with at least one venting opening 13. The lid 12 is positioned at the level of the flange 4 of the sleeve 3 and is fastened in a suitable way to the sleeve 3. For example, it can be screwed into the corresponding end of the sleeve 3 so that the prestress of the pressure spring 11 can be adjusted continuously.

The piston 6 projects axially from the sleeve 3 and is positioned with its portion adjacent the flange 7 on the inner side 14 of the flange 5.

The sleeve 3 projects into a cylindrical part 15 of the cup-shaped sealing element 16 provided at its open end with a holding member in the form of a radial outwardly oriented flange 17. The flange 17 is clamped in the mounted position between the flange 4 of the sleeve 3 and a radial shoulder surface 18 of the structural component 1. The cylindrical part 15 of the sealing element 16 is positioned between the cylindrical inner wall 19 of the receptacle 2 and the sleeve 3. Preferably, the cylindrical part 15 is clamped between the sleeve 3 and the inner wall 19 of the receptacle 2.

The cylindrical part 15 of the sealing element 16 has a transition into a sealing element portion 20 that is elastically deformable and has a closed bottom 21. It delimits the receptacle 2 in which the medium is contained. The sealing element portion 20 is a bellows that is prestressed and rests against the free end face 22 of the piston 6. The operating pressure at which the medium is pressurized is acting on the bottom 21 and the bellows 20 of the sealing element 16. Accordingly, the prestress (prestressing force) of the pressure spring 11 is adjusted to the operating pressure. The spring prestress corresponds to the operating pressure at which the medium is pressurized. The bellows 20 projects axially past the flange 4 of the sleeve 3 and is deformable.

The flange 4 of the sleeve 3 is clamped tightly by a crimped portion 23 at the rim of the opening 24 of the structural component 1.

The compensation device can be fastened easily in the receptacle 2 of the structural component 1. The sleeve 3 with the sealing element 16 positioned thereon is inserted into the receptacle 2 and is fastened in the receptacle 2 by forming the crimped portion 23. The piston 6 and the pressure spring 11 can be inserted subsequently into the pre-assembled sleeve 3 and can be secured by the lid 12. However, it is also possible to first arrange the piston 6, the pressure spring 11, and the lid 12 in the sleeve 3. Then, the compensation device pre-assembled in this way can be inserted into the receptacle 2 and secured by means of the crimped portion 23.

When the medium contained in the receptacle 2, preferably a urea-water solution, freezes and expands, the piston 6 is moved against the force of the pressure spring 11 causing a corresponding deformation of the bellows 20 so that the volume expansion of the medium is safely compensated. As soon as the medium thaws out, the pressure spring 11 pushes the piston 6 back, and the piston 6, in turn, expands the bellows 20 by acting on the bottom 21. The compensation device in this way reliably ensures that the volumetric expansions caused by freezing of the medium in the receptacle 2 will not cause any damage.

The compensation device, or parts thereof, can be removed simply, as needed. The pressure spring 11 and the piston 6, after releasing the lid 12, can be easily exchanged without removing the sleeve 3.

Figure 2:
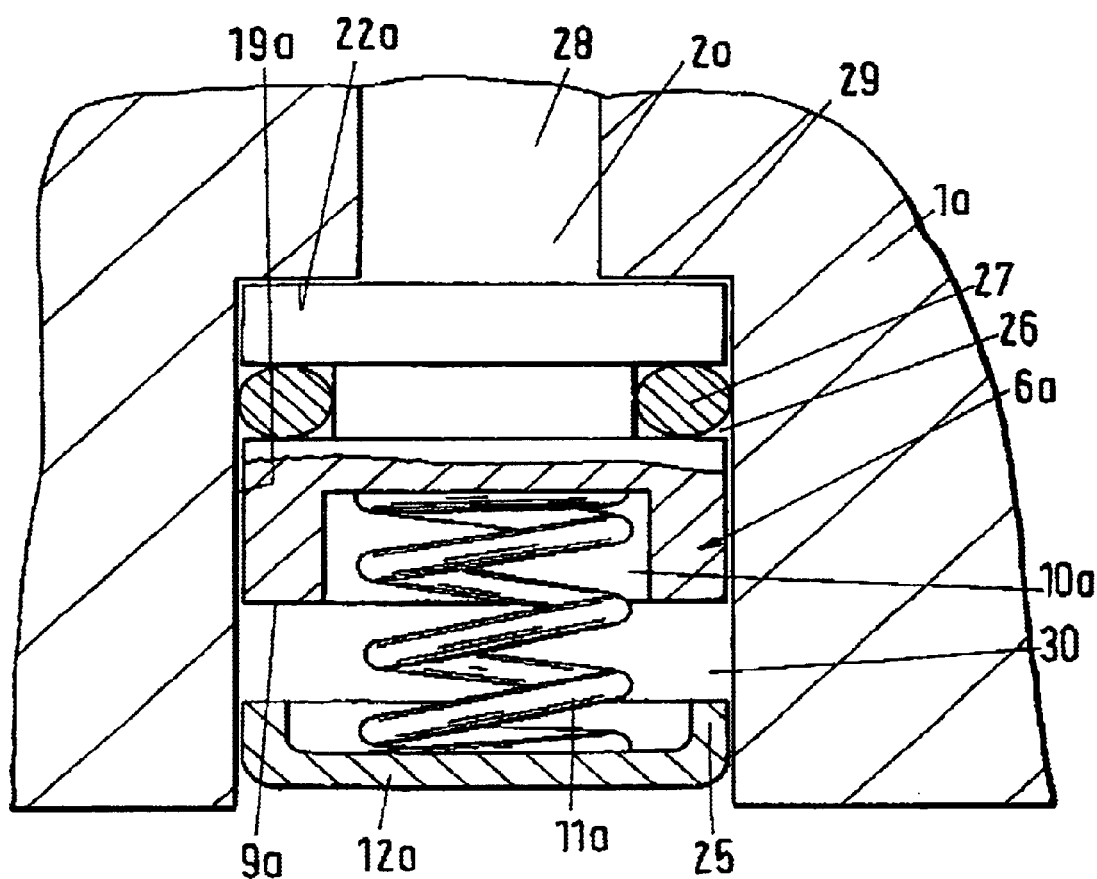
FIG. 2 shows in a representation corresponding to FIG. 1 a second embodiment of the compensation device according to the invention.

In the embodiment according to FIG. 2, the pressure spring 11a is supported with one end on the lid 12a whose rim 25 is bent at a right angle. By means of this rim 25, the lid 12a is pressed into the receptacle 2a of the component 1a. The rim 25 of the lid 12a is oriented toward the piston 6a. The end face 9a of the piston 6a has a recess 10a into which the other end of the pressure spring 11a projects.

The piston 6a is provided with an annular groove 26 in which a sealing ring 27 is arranged. In the illustrated embodiment, an O-ring is provided; however, the sealing ring can also be of any other suitable configuration, for example, a quad ring. By means of the sealing ring 27, the piston 6a rests seal-tightly against the inner wall 19a of the receptacle 2a. The receptacle 2a has a section 28 of a reduced diameter which passes via a radial annular shoulder surface 29 into a section 30 of a larger diameter. In the section 30 the piston 6a and the lid 12a are arranged. The end face 22a of the piston 6a rests under the force of the pressure spring 11a against the shoulder surface 29. As in the preceding embodiment, the prestress (prestressing force) of the pressure spring 11a corresponds to the operating pressure of the medium which is contained in the section 28.

As in the preceding embodiment, a volumetric expansion of the medium caused by freezing can be compensated by movement of the piston 6a against the force of the pressure spring 11a. The piston 6a has advantageously an outer diameter which is minimally smaller than the diameter of the receptacle section 30. In this way, the piston 6a can move without problems in the receptacle 2a.

The lid 12a is advantageously provided with at least one venting opening (not illustrated) so that the air, upon movement of the piston 6a, can be released from the receptacle portion 30 to the exterior and, upon retraction of the piston 6a, can be sucked in.

The compensation device of FIG. 2 can be mounted easily in the receptacle 2a of the structural component 1a. The piston 6a and the pressure spring 11a are moved into the receptacle section 30 to such an extent that the piston 6a comes to rest against the shoulder surface 29. Subsequently, the lid 12a is pressed into the receptacle section 30. In the mounted position, the lid 12a is advantageously sunk. It is also possible to provide the lid 12a with an outer thread which can be screwed into an inner thread provided in the inner wall 19a of the receptacle section 30.

The described compensation devices can be mounted at many different locations of the structural components 1, 1a with minimal expenditure. The compensation devices operate reliably and compensate volumetric expansions of the medium during freezing so that any damage as a result of freezing of the medium within the receptacle 2, 2a can be reliably prevented.

While specific embodiments of the invention have been shown and described in detail to illustrate the inventive principles, it will be understood that the invention may be embodied otherwise without departing from such principles.

What is claimed is:

1. A compensation device for compensating a volumetric expansion of a medium during freezing, the compensation device comprising:
  a receptacle provided in a structural component and configured to contain a medium;
  a sealing element delimiting the receptacle;
  wherein the sealing element comprises a bellows that is loaded on a first side by an operating pressure of the medium contained in the receptacle and is prestressed on a second side by a prestressing force acting against the operating pressure of the medium;
  a sleeve arranged inside the sealing element;
  a piston slidably mounted in the sleeve such that an end face of the piston rests against the second side of the bellows;
  at least one pressure spring arranged inside the piston and acting through the piston on the bellows to provide the prestressing force.

2. The device according to claim 1, wherein the sleeve has at least one stop for limiting a movement path of the piston.

3. The device according to claim 2, wherein the sleeve has a first end provided with a radial inwardly oriented flange, wherein the radial inwardly oriented flange forms the stop.

4. The device according to claim 2, wherein the sleeve has a second end provided with a holding part.

5. The device according to claim 4, wherein the holding part is a radial outwardly oriented flange.

6. The device according to claim 1, wherein the piston projects axially past the sleeve.

7. The device according to claim 1, wherein the sealing element is secured between the sleeve and an inner wall of the receptacle.

8. The device according to claim 1, wherein the sealing element has at least one holding member at an end remote from the bellows.

9. The device according to claim 8, wherein the holding member of the sealing element is a radial outwardly oriented flange.

10. The device according to claim 1, further comprising a lid secured in the receptacle, wherein the pressure spring is supported on the lid.

11. The device according to claim 1, wherein the medium is a urea-water solution.

12. A compensation device for compensating a volumetric expansion of a medium during freezing, the compensation device comprising:
  a receptacle provided in a structural component and configured to contain a medium;
  a sealing element delimiting the receptacle;
  wherein the sealing element is prestressed by a prestressing force against an operating pressure of the medium;
  wherein the sealing element comprises a bellows loaded on a first side by the operating pressure of the medium and on a second side by the prestressing force;
  a piston, wherein the bellows rests against an end face of the piston;
  a sleeve inserted into the receptacle, wherein the sealing element surrounds the sleeve across a portion of a length of the sleeve;
  wherein the sleeve has a second end provided with a holding part;
  wherein the holding part of the sleeve is secured by a crimped portion of the structural component.

13. A compensation device for compensating a volumetric expansion of a medium during freezing, the compensation device comprising:

a receptacle provided in a structural component and configured to contain a medium;

a sealing element delimiting the receptacle;

wherein the sealing element is prestressed by a prestressing force against an operating pressure of the medium;

wherein the sealing element comprises a bellows loaded on a first side by the operating pressure of the medium and on a second side by the prestressing force;

a piston, wherein the bellows rests against an end face of the piston;

a sleeve inserted into the receptacle, wherein the sealing element surrounds the sleeve across a portion of a length of the sleeve;

wherein the sealing element has at least one holding member at an end remote from the bellows;

wherein the holding member of the sealing element is a radial outwardly oriented flange;

wherein the sleeve has a second end provided with a holding part and wherein the holding member of the sealing element is secured by the holding part of the sleeve.

14. The device according to claim 13, further comprising at least one pressure spring acting on the sealing element to provide the prestressing force.

* * * * *